(12) United States Patent
Birkeli

(10) Patent No.: US 6,459,323 B2
(45) Date of Patent: Oct. 1, 2002

(54) INTERFACE ISOLATOR AND METHOD FOR COMMUNICATION OF DIFFERENTIAL DIGITAL SIGNALS

(75) Inventor: Inge Birkeli, Lunner (NO)

(73) Assignee: Dolphin Interconnect Solutions AS, Bogerud (NO)

( * ) Notice: Subject to any disclaimer, the term of this patent is extended or adjusted under 35 U.S.C. 154(b) by 0 days.

(21) Appl. No.: 09/810,697

(22) Filed: Mar. 16, 2001

Related U.S. Application Data

(62) Division of application No. 09/894,188, filed on Aug. 14, 1997, now abandoned.

(51) Int. Cl.[7] .............................................. H03L 5/00
(52) U.S. Cl. .......................... 327/333; 327/561; 326/62
(58) Field of Search ....................... 327/333, 560–563, 327/205, 206, 65, 67, 87, 89, 96, 552, 553, 558, 103; 326/62, 63, 68; 330/252, 254, 282

(56) References Cited

U.S. PATENT DOCUMENTS

| | | | |
|---|---|---|---|
| 3,260,947 A | 7/1966 | Dorsman | 330/258 |
| 3,699,469 A | 10/1972 | Elazar | 330/258 |
| 3,883,816 A | 5/1975 | Best et al. | 330/258 |
| 4,570,034 A | 2/1986 | Serrano | 179/54 |
| 4,573,168 A | 2/1986 | Henze et al. | 330/255 |
| 4,763,340 A | 8/1988 | Yoneda et al. | 375/377 |
| 4,926,135 A | 5/1990 | Voorman | 330/107 |
| 5,105,163 A | 4/1992 | Voorman | 330/107 |
| 5,300,896 A | 4/1994 | Suesserman | 330/260 |
| 5,412,346 A | 5/1995 | Burger, Jr. et al. | 330/262 |
| 5,424,675 A * | 6/1995 | Matsuhita | 327/558 |
| 5,539,333 A | 7/1996 | Cao et al. | 326/63 |
| 5,699,016 A | 12/1997 | Federspiel et al. | 330/260 |

FOREIGN PATENT DOCUMENTS

| | | | |
|---|---|---|---|
| JP | 54-151362 | 11/1979 | 327/205 |

OTHER PUBLICATIONS

International Search Report; PCT/NO95/00041; Göran Magnusson; Jan. 18, 1996.

* cited by examiner

*Primary Examiner*—Tuan T. Lam
(74) *Attorney, Agent, or Firm*—Fish & Richardson P.C.

(57) ABSTRACT

A method for coupling a differential signal generated by a digital processing unit includes high-pass filtering the differential signal. The filtered output of the high-pass filter is then provided to an input of a differential amplifier, the output of which is fed back to the input of the differential amplifier.

30 Claims, 3 Drawing Sheets

| f(Hz): | 1M | 10M | 100M | 250M | 500M | 1G | 2G |
|---|---|---|---|---|---|---|---|
| Z(Ω): | 7k | 700 | 130 | 111 | 109 | 108 | 108 |

Isolator input impedance v.s. frequency component

INTERFACE ISOLATOR AND METHOD FOR COMMUNICATION OF DIFFERENTIAL DIGITAL SIGNALS

RELATED APPLICATIONS

This application is a divisional application of U.S. application Ser. No. 08/894,188, filed on Aug. 14, 1997, now abandoned, the contents of which are herein incorporated by reference.

The present invention relates to data transmission, and in particular, to the transmission of data between digital processing elements operating at differing voltage ranges.

BACKGROUND OF THE INVENTION

In many cases, it is important for one digital processing element, referred to as a "source element," to provide data to another, referred to as the "target element," for further processing.

One difficulty encountered in transmitting data in this manner is that any noise in the output signal of the source element is passed on to the target element. This can result in spurious errors in processing carried out by the target element.

Another difficulty encountered in transmitting data in this manner is that the signal voltage levels of a source element may not be those expected by the target element. This can occur when, for example, the source and target elements do not share a common power supply or grounding system.

One approach to transmitting data between a source and a target element is to transmit a differential signal. However, a difficulty in doing so is that the common mode range, which is the limited voltage range within which the signals must be kept, is often only 2V, with the upper limit at the most positive voltage ($V_{CC}$). For PECL (pseudo emitter coupled logic) or LVDS (low voltage differential signals) systems having power supplies, variations in the supply voltage, even when well within specifications, may cause the common mode range voltage ($V_{CMR}$) to exceed limits. A voltage drop on ground wires between the systems, caused by return current of other interfaces, electrostatic discharge, or ground currents of any source and frequency, may often also cause the common mode range voltage to exceed these limits. Although an excursion beyond the $V_{CMR}$ limits will cause permanent damage to a device in only extreme cases, such excursions are very likely to cause data errors.

In some cases, there may be a missing ground connection between the source and the target. This can result in particularly large potential differences between the source and the target.

In extreme cases, with 220V mains and a grounding error in both systems, the peak-to-peak voltage between the systems may exceed 300V.

BRIEF SUMMARY OF THE INVENTION

In accordance with the invention, there is provided a method for coupling a digital signal generated by a digital processing unit by high-pass filtering the differential signal, thereby generating a filtered differential signal. The filtered differential signal is then provided to an input of a differential amplifier, the output of which is fed back to the input. This output can then be provided to, for example, a densecond digital processing unit, or to a transmission cable.

In one practice of the invention, the high-pass filtering of the differential signal is achieved by applying a first voltage to a first capacitor and applying a second voltage to a second capacitor. The difference between this first and second voltage defines the differential signal. A resistive shunt is then provided between the first and second capacitors.

The output of the differential amplifier can be fed back to the input by providing a feedback resistor between the output and the input. This can be achieved by providing a first feedback resistor between a positive output of the differential amplifier and a positive input of the differential amplifier and providing a second feedback resistor between a negative output of the differential amplifier and a negative input of the differential amplifier.

The invention also includes an interface circuit for coupling a differential signal generated by a digital processing unit. Such an interface circuit includes a high-pass filter having a high-pass-filter input for receiving the differential signal and a high-pass-filter output. The high-pass filter is coupled to a differential amplifier having a differential-amplifier input in electrical communication with the high-pass-filter output. An output of the differential-amplifier is coupled to a resistive feedback-network. This resistive feedback-network provides electrical communication between the differential-amplifier output and the differential-amplifier input.

These and other features and advantages of the invention will be apparent from the following description and the accompanying drawings in which:

DETAILED DESCRIPTION OF PREFERRED EMBODIMENT

Figure 1:
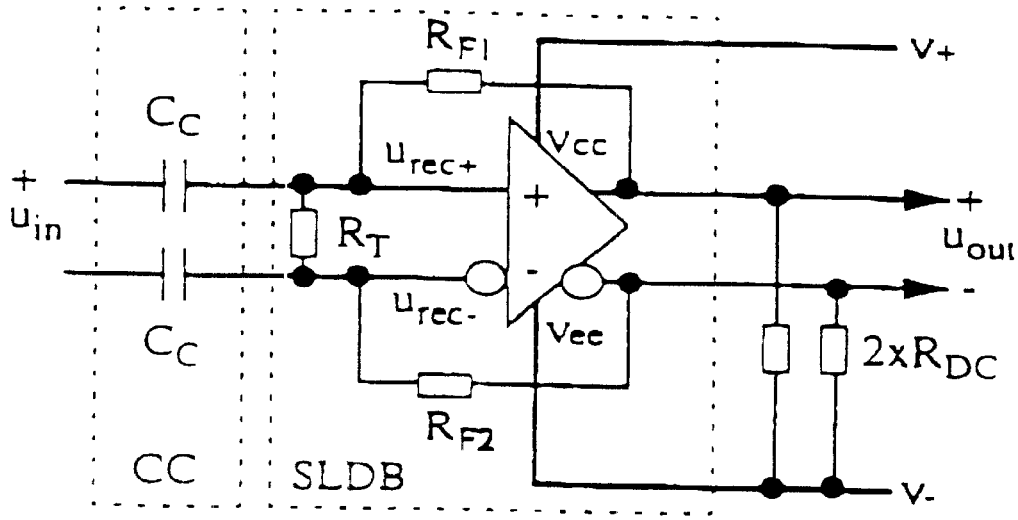
FIG. 1 shows the preferred embodiment of the interface isolation circuit of the invention.

FIG. 1 shows the preferred embodiment of the interface circuit for one bit, which consists of two main parts: a charge coupler CC including two capacitors $C_C$, and a part that is a self latching differential buffer SLDB including a differential amplifier (receiver) and a resistive feedback network including resistors $R_{F1}$, $R_T$ and $R_{F2}$. Different types of differential amplifiers may fulfill the requirements set, but in the current implementation of the interface circuit the Motorola ECL in PC MC 100E116 ECL is used. This Motorola circuit is of a type with open emitter followers at the output, and therefore a DC biasing resistor RDC is applied to each output.

In FIG. 1, power to the differential amplifier is supplied from the output side of the circuit. The receiver can also be powered from the input side of the interface circuit. However, if the receiver power is to be supplied in this manner, a DC/DC converter with sufficient isolation capability must be used.

It should be noted that the resistor network of the self-latching differential buffer also serves as line AC impedance termination, and together with the two capacitors of the charge coupler, as a highpass filter.

Figure 2:
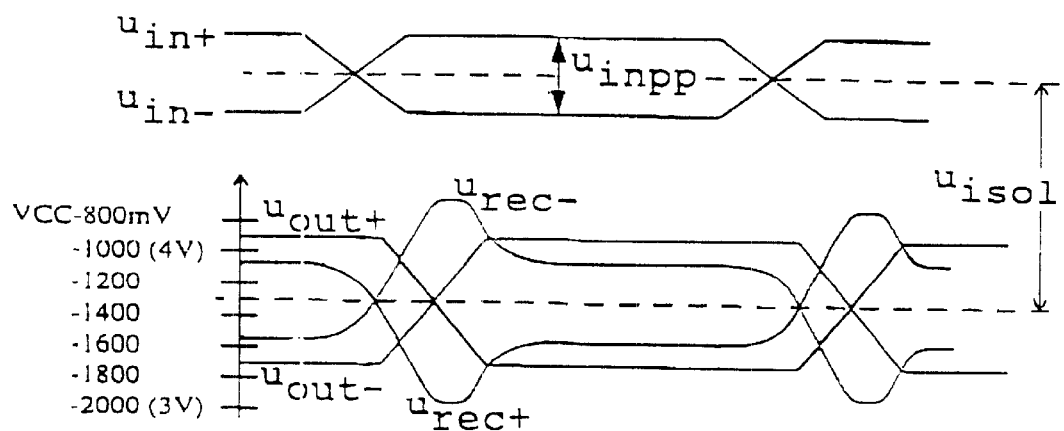
FIG. 2 shows a voltage versus time diagram for input and output voltages of the interface circuit.

Referring to FIG. 2, which shows the relation between input and output signals for the interface circuit of FIG. 1, the following remarks should be made. Initially, after power up, the state of the latch output $u_{out}$ is arbitrary. However, at any transient of the input signal $u_{in}$, $u_{out}$ will stay at or switch to the same state as $u_{in}$ after transition, provided that the rise/fall-time, the transition level and the skew properties of the input signal are all within defined limits. The feedback resistors will cause the receiver to act like a Schmitt-trigger, i.e. accelerate the switching. The isolation voltage capability $u_{isol}$ is indicated, and may typically have a value of about 500 V. The peak-to-peak voltage of the input differential signal is indicated as $u_{inpp}$, and the remaining symbols shown in FIG. 2 also appear in FIG. 1.

One notes, when looking at FIG. 2, that the voltages (e.g. $u_{rec-}$) on the input side of the differential amplifier react very rapidly to a change in $u_{in+}$ and $u_{in-}$, i.e., the voltage rise of $u_{rec-}$ is accelerated due to positive feedback. As clearly appears, $u_{rec-}$ overshoots somewhat before finding a new stable value, since $u_{rec-}$ will be a sum of a signal arriving from the input capacitors and a signal fed back (and divided down) by the feedback network from the amplifier output.

It is to be noted that the interface circuit shown in FIG. 1 is a low-cost circuit that consumes quite moderate power and saves space. The circuit exhibits extremely low signal delay, with typical delay values for the implementation shown in FIG. 1 being less than 0.5 ns, and very little skew. It is therefore well suited for parallel transmission, especially for applications like SCI links (scalable coherent interface links, refer to the IEEE standard for scalable coherent interface (SCI) std. 1596–1992). The interface circuit is also excellent for interfacing different signal families, and it eliminates any $V_{CMR}$ problems as discussed in the introductory part of the description. Further, the circuit may easily be designed to withstand 500V, and for special applications, even up to 2000V.

There are three different families of differential signals which are of current interest for application with the interface circuit of the present invention. These families are: emitter coupled logic (ECL), pseudo emitter coupled logic (PECL) and low voltage differential signals (LVDS). The same circuitry may also be used with any other signal families having a typical signal swing in the range of 400 mV to 1V, rise and fall times of 250 ps to 2 ns, and maximum differential skew of 500 ps. With adapted components and component values, the principle of the circuit may be applied to any digital differential signal system.

Figure 3:
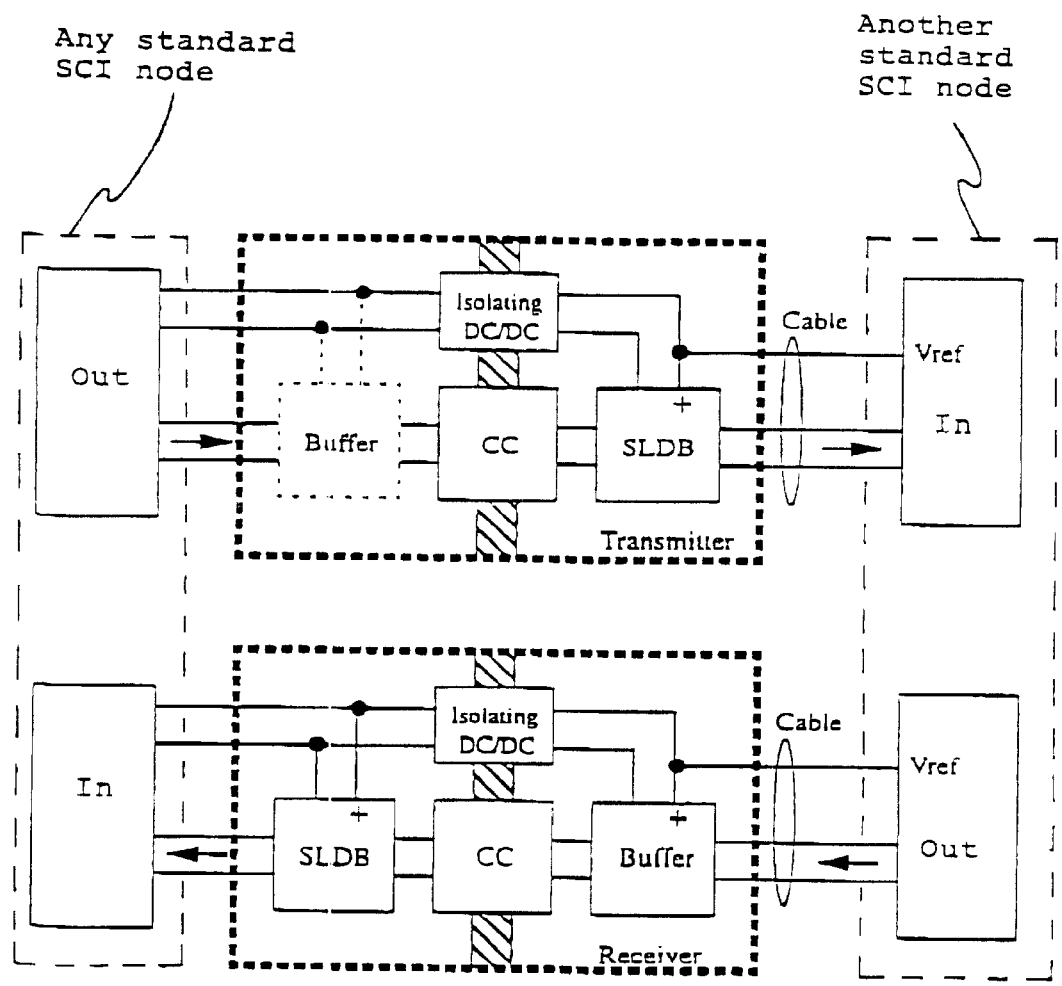
FIG. 3 shows the interface circuit in an application in an SCI link both in a transmitter and a receiver configuration.

In FIG. 3, there is depicted an application of the interface circuit of the invention with an SCI link, with signals as mentioned in the previous section, in order to avoid all the general interfacing problems described in the introduction. The interface circuit of the invention, comprising the charge coupler section CC and the self latching differential buffer section SLDB, is arranged in respectively a transmitter and a receiver unit which also incorporates a buffer in front of the CC section in the receiver and an optional buffer in the transmitter. Power is supplied through an isolating DC/DC converter in both cases. The interface circuit of the invention may be integrated into an EDU device (External Divider Unit, for ring topology) or in a switch (for the case of star topology), or as a separate device to be inserted to the link cable. In FIG. 3, there is indicated a solution where the transmitter and receiver units are inserted (as one or two "boxes") between a standard SCI node, indicated at left, and a cable (or two cables) on the right that is connected to some other standard SCI node. The transmitter and receiver units may be add-on units to be coupled to the left node by means of the cable connector, and have corresponding cable connector(s) on the right side for mating with the cable. Or, the transmitter and receiver may be added or integrated inside the left node and be a part thereof. Power may be supplied from the closest node through the cable connector, or from an attached power supply. If the transmitter is instead connected to the SCI link on the left side of the drawing through a cable (not shown in FIG. 3), thus receiving signals of reduced quality, a buffer has to be applied prior to the CC section (such a buffer is indicated by dotted lines). Otherwise, if the transmitter circuitry is integrated in the node circuitry as mentioned above, or is directly connected thereto via a plug, this buffer may be omitted.

In the receiver section shown in FIG. 3, where a cable is connected on the right side, a buffer must of course be used to restore signal quality on the input side.

In FIG. 3, $V_{ref}$ is the signal reference voltage of the signal type in question, i.e. for PECL signals $V_{ref}$ is $V_{CC}=+5V$, for ECL signals $V_{ref}$ is $V_{CC}=0V$, and for LVDS signals $V_{ref}$ is +2V, provided by dividing from $V_{CC}$.

Figures 4, 5:
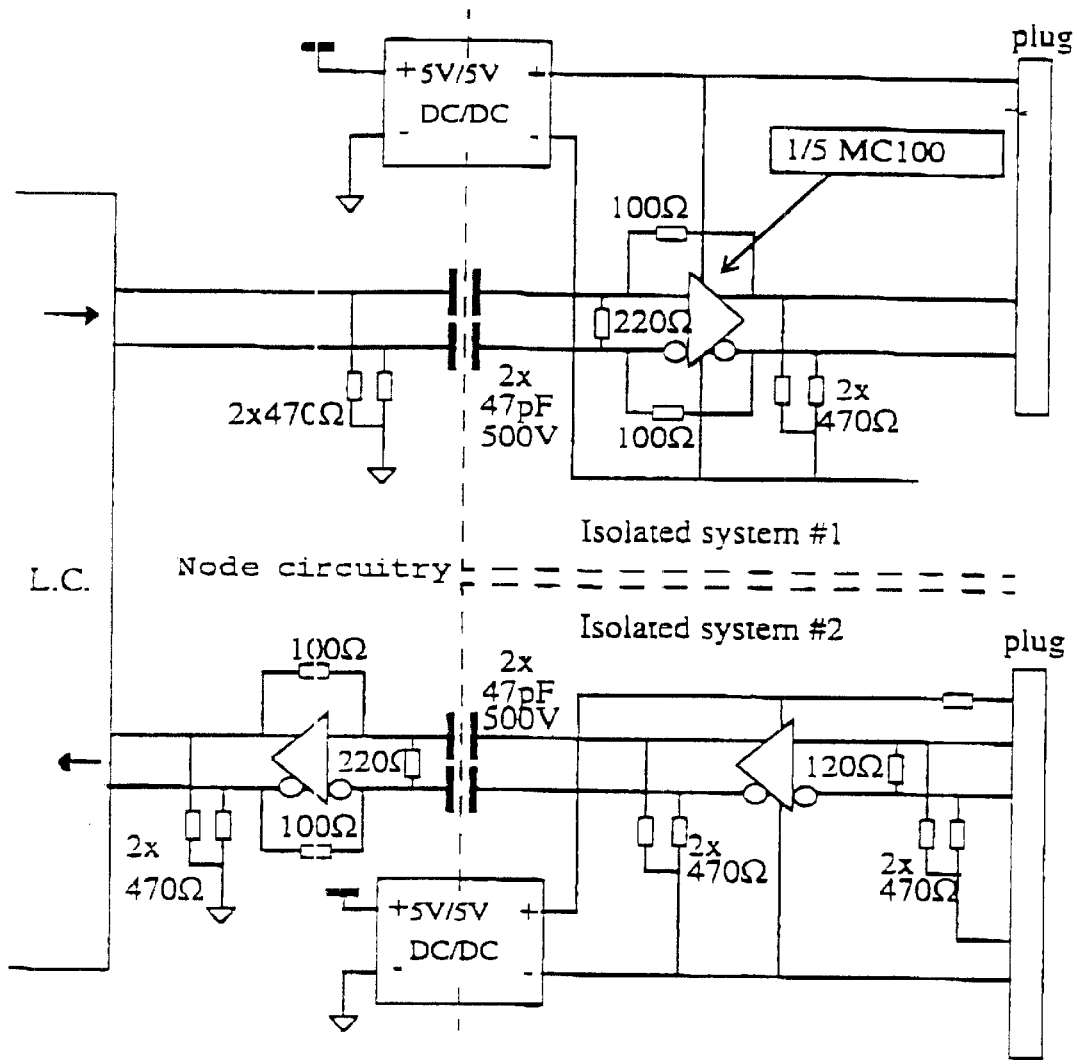
FIG. 4 shows an application of interface circuits in connection with a link controller and FIG. 5 is a table showing isolator input impedance versus frequency.

FIG. 4 shows another application example where the interface circuit of the invention is used. This is an application with a link controller, and the drawing shows one out of eighteen bits, in each direction. Practical component values are also indicated in the drawing, and with these component values the relation between isolator input impedance and frequency will be as indicated in FIG. 5. The dashed lines indicate the separation between different systems, i.e., the isolation borders. The left "node circuitry" is the same as the left part of FIG. 3, i.e., to the left of the "wall" having slanted lines in FIG. 3. The top part of FIG. 4 shows a transmitter, and the lower part shows a receiver, as in FIG. 3. There are plugs on the far right side, indicating an integrated construction as mentioned above.

With the components selected as shown, and for the high signal frequencies of interest, the link controller will see an impedance quite near the desired 100 ohm value when looking toward the transmitter, while the isolating effect for low frequencies will be quite sufficient, in the megaohm range at DC. This effect appears clearly from FIG. 5.

Having described the invention, and a preferred embodiment thereof, I claim:

1. A method for coupling a differential digital signal generated by a digital processing unit, said method comprising:

high-pass filtering said differential digital signal, thereby generating a filtered differential digital signal;

providing said filtered differential digital signal to an input of a differential amplifier to generate a differential digital output signal at an output of said differential amplifier; and feeding said output of said differential amplifier back to said input.

2. The method of claim 1, further comprising providing said output differential digital signal of said differential amplifier to a second digital processing unit.

3. The method of claim 1, further comprising providing said output differential digital signal of said differential amplifier to a transmission cable.

4. The method of claim 1, wherein high-pass filtering said differential digital signal comprises applying a first voltage to a first capacitor;

applying a second voltage to a second capacitor, a difference between said first and second voltage defining said differential digital signal; and providing a resistive shunt between said first and second capacitors.

5. The method of claim 1, wherein feeding said output of said differential amplifier back to said input comprises providing a feedback resistor between said output and said input.

6. The method of claim 1, wherein feeding said output of said differential amplifier back to said input comprises connecting said output directly to said input through a feedback resistor.

7. The method of claim 1, wherein feeding said output of said differential amplifier back to said input comprises:

providing a first feedback resistor between a positive output of said differential amplifier and a positive input of said differential amplifier; and providing a second feedback resistor between a negative output of said differential amplifier and a negative input of said differential amplifier.

8. The method of claim 1, wherein providing said filtered differential digital signal to an input of said differential amplifier comprises:

providing a first input signal to a positive input of said differential amplifier; and providing a second input signal to a negative input of differential amplifier, a difference between said first and second input signals defining said filtered differential digital signal.

9. A method for interfacing digital processing units, said digital processing units communicating using a differential digital signal, said differential digital signal being communicated via a line pair having one positive-signal input line and one negative-signal input line, said method comprising:

providing said differential digital signal to a charge-coupler input stage;

providing an output of said charge-coupler input stage to an input of a self-latching differential-buffer stage to generate a differential digital output signal at an output of said self-latching differential-buffer stage;

providing resistive positive feedback between an output of said self-latching differential-buffer stage and said input of said self-latching differential-buffer stage.

10. The method of claim 9, wherein providing said differential digital signal to a charge-coupler input stage comprises:

providing a first capacitor for said positive-signal input line; and providing a second capacitor for said negative-signal input line.

11. The method of claim 10, wherein providing an output of said charge-coupler input stage to an input of said self-latching differential-buffer stage comprises providing a differential amplifier including a positive input terminal connected to said first capacitor, a negative input terminal connected to said second capacitor, a positive output terminal, and a negative output terminal.

12. The method of claim 11, wherein providing a resistive positive feedback between said output of said self-latching differential-buffer stage and said input of said self-latching differential-buffer stage comprises:

providing a first feedback resistor connecting said positive output terminal with said positive input terminal; and providing a second feedback resistor connecting said negative output terminal and said negative input terminal.

13. The method of claim 11, further comprising providing a cross-coupled resistor connected between said positive input terminal and said negative input terminal.

14. The method of claim 11, wherein providing said resistive positive feedback network comprises:

connecting a first resistor directly between said positive input terminal and said positive output terminal; and connecting a second resistor directly between said negative input terminal and said negative output terminal.

15. A method for interfacing digital processing units communicating by means of differential signals, one of the differential signals being communicated by a line pair having a positive-signal input line and a negative-signal input line, said method comprising:

connecting said line pair to a charge-coupler input stage, said charge-coupler input stage including a first capacitor for connection to said positive-signal input line, and a second capacitor for connection to said negative-signal input line;

connecting an output of said charge-coupler input stage to a self-latching differential-buffer stage connected directly after said charge-coupler input stage, said self-latching differential-buffer stage including a differential amplifier having a positive input connected to said first capacitor, a negative input connected to said second capacitor, a positive output, a negative output, open emitter followers, a first DC biasing resistor connected between said positive output and a fixed supply voltage line, and a second DC biasing resistor connected between said negative output and said fixed supply voltage line; and providing feedback to said positive and negative inputs by connecting, through a resistive positive feedback network, said positive output of said differential amplifier to said positive input of said differential amplifier, and said negative output of said differential amplifier to said negative input of said differential amplifier.

16. A method for interfacing digital processing units communicating by means of differential signals communicated by a line pair having a positive-signal input line and a negative-signal input line, said method comprising:

connecting said line pair to a charge-coupler input stage, said charge-coupler input stage including a first capacitor for connection to said positive-signal input line, and a second capacitor for connection to said negative-signal input line;

connecting an output of said charge-coupler input stage to a self-latching differential-buffer stage connected directly after said charge-coupler input stage, said self-latching differential-buffer stage including a differential amplifier having a positive input connected to said first capacitor, a negative input connected to said second capacitor, a positive output, a negative output, open emitter followers, and a first DC biasing resistor connected between said positive output and a fixed supply voltage line, and a second DC biasing resistor connected between said negative output and said fixed supply voltage line; and providing feedback to said positive input and to said negative input by connecting, through a resistive positive feedback network, said resistive positive feedback network including
    a first resistor directly connecting said positive output of said differential amplifier to said positive input of said differential amplifier, and
    a second resistor directly connecting said negative output of said differential amplifier to said negative input of said differential amplifier.

17. A method of transforming a differential digital input signal into a differential digital output signal, said method comprising:
    applying said differential digital input signal to a pair of input terminals;
    coupling said differential digital input signal to a pair of differential-amplifier inputs through a pair of a-c coupling capacitors, each of said a-c coupling capacitors being coupled between a corresponding one of the pair of input terminals and a corresponding one of the pair of differential-amplifier inputs
    passing a feedback signal from a pair of differential-amplifier outputs to said differential-amplifier inputs through a resistive positive feedback network, said resistive positive feedback network including
        a pair of feedback resistors, each one being coupled between a corresponding one of the pair of inputs of the differential amplifier and a corresponding one of the pair of outputs of the differential amplifier in a positive feedback arrangement; and
        a cross-coupled resistor connected between the pair of inputs of the differential amplifier; and
    providing said differential digital output signal through said pair of differential-amplifier outputs.

18. A digital interface circuit configured to transfer digital signals and provide galvanic isolation between digital processing units or between a digital processing unit and a transmission cable, said digital processing units communicating using differential digital signals, the differential digital signals being communicated via a line pair including a positive and a negative signal input line, said digital interface circuit comprising:
    an input;
    a charge coupler input stage connected to said input, the input stage including a capacitor connected to said positive signal input line and a capacitor connect to said negative signal input line;
    a self-latching differential buffer stage connected directly to said input stage, said self-latching differential buffer stage including
        a differential amplifier including
            a pair of input terminals, each input terminal connected directly to a respective one of said capacitors,
            a pair of output terminals configured to produce a differential digital output signal, and
            a resistive positive feedback network including a pair of feedback resistors each one being coupled between a corresponding one of the pair of input terminals and a corresponding one of the pair of output terminals in a positive feedback arrangement and a cross-coupled resistor connected between the input terminals of the differential amplifier.

19. The digital interface circuit of claim 18, wherein the pair of input terminals includes a positive input terminal and a negative input terminal, the pair of output terminals includes an positive output terminal and a negative output terminal, and the resistive network includes a feedback resistor connected directly between the positive input terminal and the positive output terminal and a feed back resistor connected directly between the negative input terminal and the negative output terminal.

20. An interface circuit for signal transfer and galvanic isolation between digital processing units or between a digital processing unit and a transmission cable, said digital processing units communicating by means of differential signals, one of the differential signals being communicated via a line pair comprising one positive and one negative signal input line, said interface circuit comprising a charge coupler input stage including one respective capacitor for each respective of said positive and negative signal input lines, at input end of said interface circuit, and a self-latching differential buffer stage connected directly after said input stage, said self-latching differential buffer stage comprising a differential amplifier having its respective inputs connected directly to respective ones of said capacitors, and a resistive positive feedback network connected between the input and output terminals of the amplifier; and
    wherein said differential amplifier is of a type having open emitter followers and has DC biasing resistors connected between each amplifier output and a fixed supply voltage line.

21. An interface circuit for signal transfer and galvanic isolation between digital processing units or between a digital processing unit and a transmission cable, said digital processing units communicating by means of differential signals, one of the differential signals being communicated via a line pair comprising one positive and one negative signal input line, said interface circuit comprising a charge coupler input stage including one respective capacitor for each respective of said positive and negative signal input lines, at input end of said interface circuit, and a self-latching differential buffer stage connected directly after said input stage, said self-latching differential buffer stage comprising a differential amplifier having its respective inputs connected directly to respective ones of said capacitors, and a resistive positive feedback network connected between the input and output terminals of the amplifier; and
    wherein the resistive network comprises a resistor connected directly between each respectively positive input and output and each respectively negative input and output of said differential amplifier and
    wherein said differential amplifier is of a type having open emitter followers and has DC biasing resistors connected between each amplifier output and a fixed supply voltage line.

22. A digital interface circuit, comprising:
    a pair of input terminals for receiving a differential digital input signal;
    a pair of output terminals for producing a differential digital output signal;
    a differential amplifier having a pair of inputs and a pair of outputs, the pair of differential amplifier outputs connected to the pair of output terminals;
    a pair of a-c coupling capacitors each one being coupled between a corresponding one of the pair of input terminals and a corresponding one of the differential-amplifier inputs; and
    resistive positive feedback network including
        a pair of feedback resistors each one being coupled between a corresponding one of the pair of inputs of the differential amplifier and a corresponding one of the pair of outputs of the differential amplifier in a positive feedback arrangement;

a cross-coupled resistor connected between the pair of inputs of the differential amplifier.

23. A digital interface circuit configured to couple a differential digital signal generated by a digital processing unit, said digital interface circuit comprising:

a high-pass filter including a high-pass-filter input configured to receive said differential digital signal and a high-pass-filter output;

a differential amplifier including a differential-amplifier input in electrical communication with said high-pass-filter output, and a differential-amplifier output to generate a differential digital output signal; and a resistive feedback-network configured to provide electrical communication between said differential-amplifier output and said differential-amplifier input.

24. The digital interface circuit of claim 23, wherein said differential-amplifier output is configured to communicate with a second digital processing unit.

25. The digital interface circuit of claim 23, wherein said differential-amplifier output is configured to communicate with a transmission cable.

26. The digital interface circuit of claim 23, wherein said high-pass filter comprises:

a first capacitor configured to receive a first voltage;

a second capacitor configured to receive a second voltage, a difference between said first and second voltage defining said differential digital signal; and a resistive shunt connected between said first and second capacitors.

27. The digital interface circuit of claim 23, wherein said resistive feedback-network comprises a feedback resistor connected between said differential-amplifier output and said differential-amplifier input.

28. The digital interface circuit of claim 23, wherein said resistive feedback-network comprises a feedback resistor configured to directly connect said differential-amplifier output and said differential-amplifier input.

29. The interface circuit of claim 23, wherein said differential-amplifier output comprises a positive output and a negative output, said differential-amplifier input comprises a positive input and a negative input, and said resistive feedback-network comprises:

a first feedback resistor connected between said positive output and said positive input of said differential amplifier; and a second feedback resistor connected between said negative output and said negative input.

30. The interface circuit of claim 23, wherein said differential amplifier comprises:

a positive input configured to receive a first input signal; and a negative input configured to receive a second input signal, a difference between said first and second input signals defining said filtered digital differential signal.

* * * * *